Patented Apr. 6, 1943

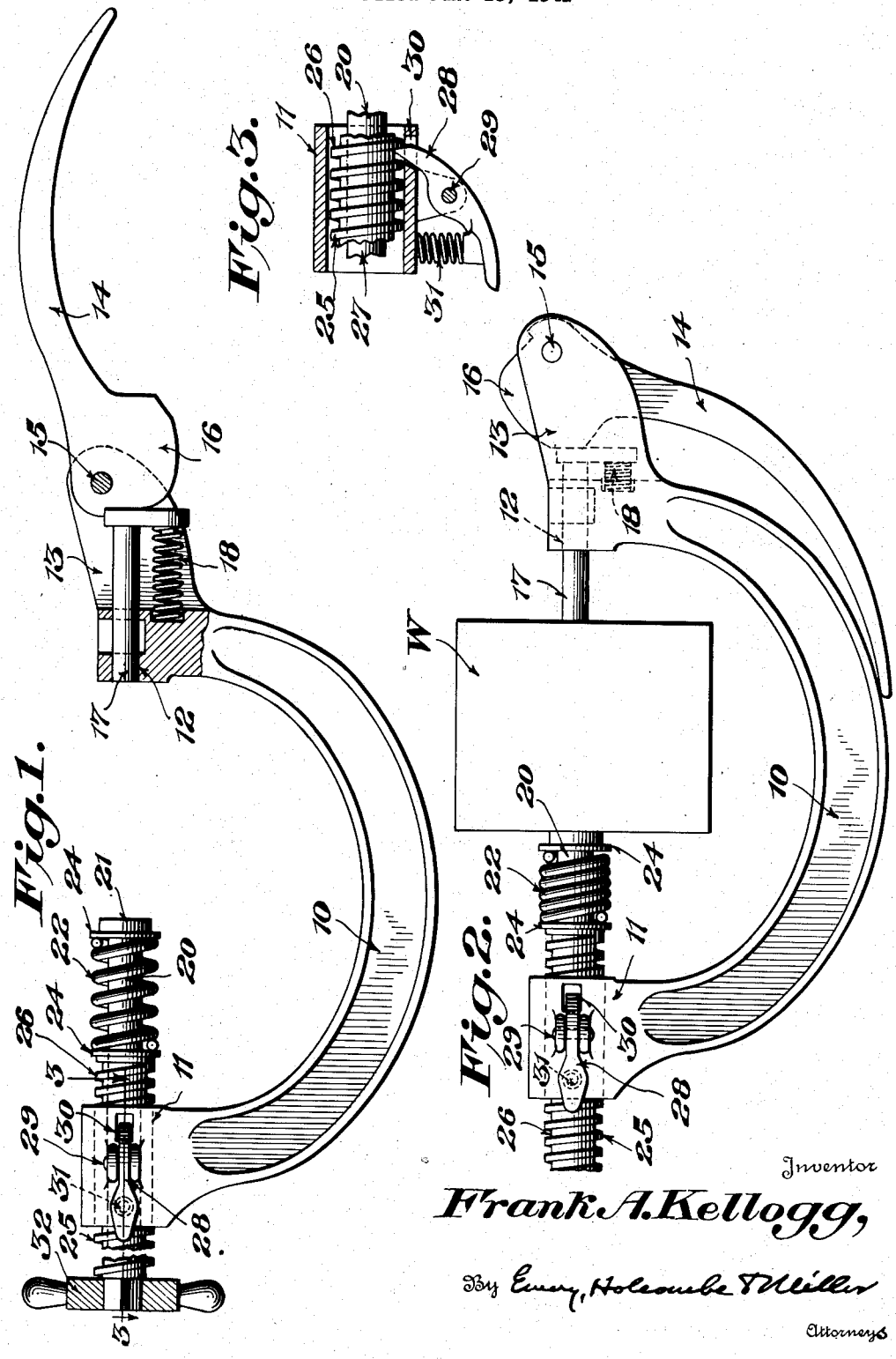

2,316,073

UNITED STATES PATENT OFFICE 2,316,073

METAL CLAMP

Frank A. Kellogg, Aurora, Ill.

Application June 18, 1941, Serial No. 398,670

1 Claim. (Cl. 144—305)

The present invention relates to clamps for holding metal work during machining operations and aims generally to improve existing clamps for that purpose.

One of the primary objects of the invention is the provision of an improved clamp which may be quickly operated to engage and disengage the work.

A further object of the invention is the provision of an improved clamp of the type referred to wherein one of the clamping plates is spring tensioned and is associated with a threaded adjusting means and the other clamping member is cam actuated for quick manipulation to engage and release the work.

Other objects and advantages of the invention will be apparent to persons skilled in the art upon reference to the accompanying drawing illustrating a preferred embodiment of the invention.

In the drawing

Fig. 1 is a side elevation of the clamp in open or released position.

Fig. 2 is a similar view of the clamp in closed or clamped position; and

Fig. 3 is an enlarged detail sectional view taken on the line 3—3 of Fig. 1.

In the embodiment of the invention illustrated in the drawing, the improved clamp comprises a U-shaped frame 10 formed at opposite ends with tubular bearings 11 and 12, one end being further provided with a bifurcated portion providing a pair of spaced ears 13 between which is operating cam lever 14 mounted on a pin 15.

The lever 14 is formed with a cam portion 16 engaging a movable clamping member 17 slidable in bearings 12 and tensioned against the cam by spring 18.

The opposite clamping member preferably comprises a screw operated clamping rod comprising a head 21 normally tensioned inwardly by a spring 22 surrounding the rod 21 and positioned between washers 24, which washers are located one adjacent and below the head 21 and the other at an end of an adjustable retaining member 25.

The adjustable retaining member 25 preferably comprises an elongated tubular screw having external threads 26, preferably square threads, and a smooth bore 27, to receive spring urged rod 20, the length of said rod being and the depth of said bore being sufficient to prevent the ejection of said rod by the expansion of the spring as illustrated in Fig. 1, and adjustably mounted in the bearing 11 of the frame. The threads 26 of the sleeve are engaged by the end of a pawl 28 mounted on a pin 29 on the outside of the bearing, the engaging end extending through opening 30 into engagement with the threads 26. The pawl 28 is normally tensioned by spring 31 to position the engaging end in engagement with the sleeve between adjacent threads.

In using the clamp, the retaining member 25 may be adjusted manually in the bearing 11 by first releasing the pawl 28 from engagement with the threads 26 and merely sliding the member 25 in the bearing. The member 25 should be so positioned in the bearing that the spring 22 is tightly compressed with its convolutions in contact with each other while the clamp is closed. To effect this adjustment the member 25 may be rotated in the sleeve as by hand wheel 32 which causes a longitudinal feed of the member 25 in the sleeve because the pawl 28 acts as a nut in engagement with the threads 26.

The length of movement of the clamping member 17 is preferably slightly in excess of the length of movement of the member 20 in the retaining member 25, which with the proper adjustment of the member 25 in the sleeve 11 insures complete compression of the spring 22 and rigid clamping of the work piece W. Similarly when the clamp is released the member 17 retracts a greater distance than member 20 is extended by the spring, facilitating quick removal of the work.

Obviously the invention is not restricted to the details of construction shown and described but includes as well equivalent constructions as fall within the scope of the appended claim.

I claim:

A work clamp comprising a U-shaped frame formed with a clamp means at one end and a bearing at its other end, a clamping member journalled in said bearing, said clamping member comprising an externally threaded long hollow sleeve, a headed long rod slidably mounted in said sleeve and a coil spring surrounding said rod and interposed between the head on said rod and said sleeve, and releasable means in said bearing for engagement with the thread of said hollow sleeve for effecting longitudinal adjustment of the sleeve in the bearing upon rotation of the sleeve.

FRANK A. KELLOGG.